Sept. 11, 1956      H. CHICKNAVORIAN      2,762,292

ELECTRIC SHISH KEBAB COOKER

Filed Jan. 8, 1954

INVENTOR.

HAGOP CHICKNAVORIAN

BY Chas. R. Fay
atty.

United States Patent Office 2,762,292
Patented Sept. 11, 1956

2,762,292

ELECTRIC SHISH KEBAB COOKER

Hagop Chicknavorian, Fitchburg, Mass.

Application January 8, 1954, Serial No. 402,975

1 Claim. (Cl. 99—421)

This invention relates to a new and improved portable electric appliance particularly adapted for broiling Shish Kebab in the home by electric heating units somewhat in the nature of those used in electric toasters, although other foods may be cooked also, such as frankfurters, etc.

This invention comprises a relatively narrow tall hollow enclosure containing on the side walls at the interior thereof a pair of spaced electric heating units such as those usually found in bread toasters. The cooking container is open at its top and closed at its bottom by a slidable removable drip pan.

At its open top, the cooking container is provided with a plurality of longitudinally adjustable bridges, each of which is provided with means for supporting a skewer in vertical position depending down within the container, these skewers being utilized for impaling the food thereon that is to be cooked in the nature of cut pieces of lamb, onions, etc.

Other objects and advantages of the invention will appear hereinafter.

Reference is to be had to the accompanying drawings, in which

In carrying out the present invention, it is preferred to utilize a relatively tall narrow container having elongated side walls 10 and 12 and connecting end walls 14 and 16. These walls are substantially continuous and are provided with legs 18 which space the same above a supporting surface. The container defined by the four walls described is open both at the top and the bottom.

Figures 2, 3:
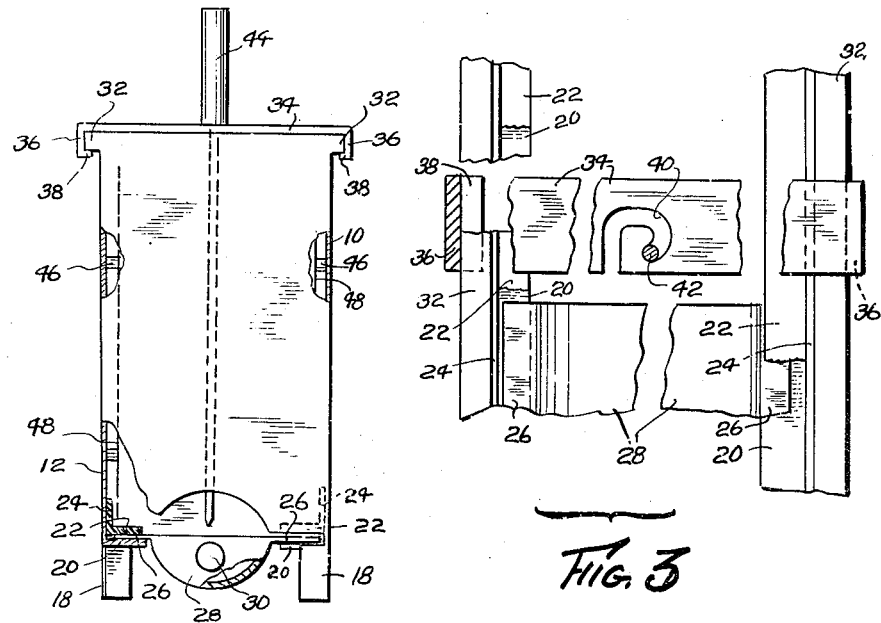
Fig. 2 is an end view thereof, looking in the direction of arrow 2 in Fig. 1, parts being broken away and in section.
Fig. 3 is an enlarged top plan view illustrating the interior construction, parts being broken away and removed for clarity of illustration.

At the bottom, the walls 10 and 12 are bent inwardly as best seen in Fig. 2 at 20 and adjacent this bend there is attached in spaced relation thereto a separate flange 22 secured by means of a rib or the like 24 to the front and rear walls in order to provide a longitudinal horizontal guideway which is duplicated on the opposite wall as clearly indicated in Fig. 3.

These horizontally elongated guideways slidingly receive side edge flanges 26 connected to a drip pan 28 having a handle 30 for sliding the same in and out so as to form a bottom for the cooking container and also to catch the drip. This pan is shown partially withdrawn in Figs. 1 and 3.

The top of the container is open as above described and at each side thereof it may be provided with a longitudinal guiding element 32 or similar means providing a sliding guide for a series of bridges generally indicated at 34. Each bridge is provided with a down-turned end 36 and an inwardly turned foot 38 under the respective guides 32. In this manner, the bridges 34 are slidably adjustable longitudinally of the cooking container and may be placed as desired according to the amount of food to be cooked and the respective sizes which may happen to be placed upon individual skewers.

Each bridge 34 is provided with a horizontal key-hole or the like slot 40 receiving individual skewers 42 against accidental dislodgement from the respective slots 40. Each skewer 42 is provided with a handle 44 which rests upon the respective bridge and of course positions the skewer point in spaced relation to the drip pan 28.

The front and rear walls are provided with insulators 46 which mount electric heating elements 48 similar to conventional bread toasting heating elements well known in the art. They are connected by an electric cord 50 to be plugged into ordinary house current receptacles for placing the device in operation.

Figure 1:
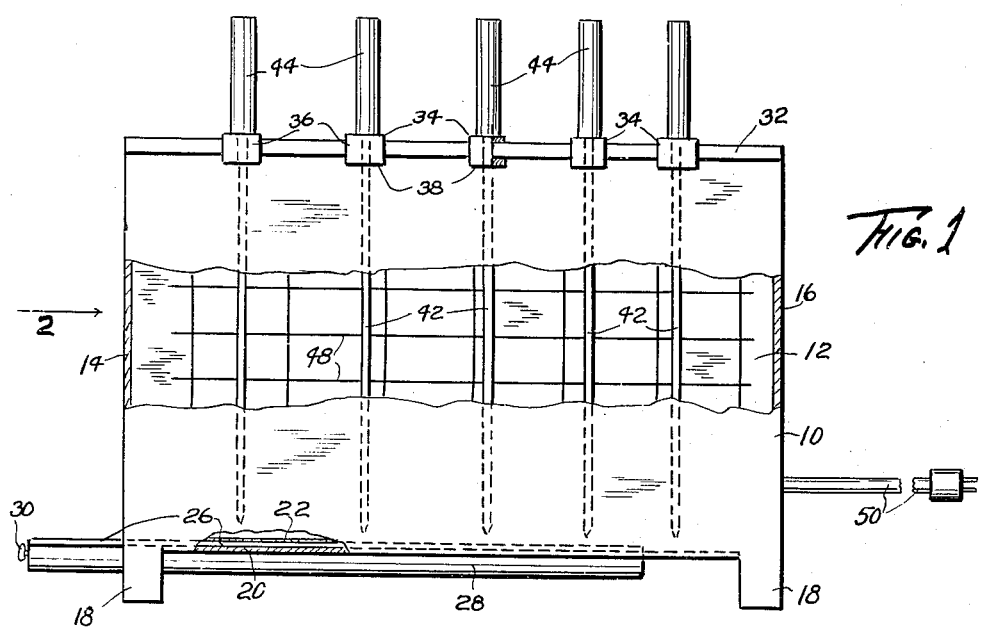
Fig. 1 is a view in side elevation, parts being broken away and in section.

The skewers are provided with meat and vegetable or whatever ingredient is to be cooked and are slipped sideways into the slots 40 so that the bridge pieces 34 may be left in position as shown in Fig. 1 and the food-laden skewers may be inserted thereinto when cooking the same. However, the bridges may be longitudinally adjusted so that they may be arranged to utilize the cooking space to the best advantage possible, it being realized that some pieces of food on the skewers may be larger than others and thus require greater spacing with respect to the next adjacent skewer. This invention therefore is seen to provide an improved Shish Kebab portable electric cooker and broiler for home use which is easily operated and cleaned and in which a variety of different foods may be conveniently broiled.

Having thus described my invention and the advantages thereof, I do not wish to be limited to the details herein disclosed, otherwise than as set forth in the claim, but what I claim is:

An electric cooking appliance of the class described comprising a relatively narrow upright container including elongated side walls, electric heating elements therein, said container being open at the top and unimpeded throughout, longitudinal guide means positioned on the elongated side walls of said container at the top edges thereof, a series of bridge elements transversely bridging the container from side wall to side wall and slidably arranged upon said guide elements for irregularly spaced disposition thereon according to the thickness of various foods to be cooked, a slot in each bridge element for receiving and holding a skewer in depending relationship within the container, and a handle on each separate skewer, said handles being held above the appliance by said means, a movable drip pan for said container, said drip pan comprising a bottom closing means for said cooking container, vertically spaced longitudinal horizontal elements within the container adjacent the bottom thereof providing longitudinal horizontal guideways at each side of the cooking container, horizontal flanges on said removable bottom for slidable reception in said guideways, and legs on said container and supporting the same in spaced relation to a supporting surface, the removable bottom element depending below the walls of the container and terminating short of the ends of the legs thereof above such supporting surface.

References Cited in the file of this patent

UNITED STATES PATENTS

| | | |
|---|---|---|
| 1,836,894 | Bedigian | Dec. 15, 1931 |
| 1,862,077 | Demmerle | June 7, 1932 |
| 2,012,702 | Zolotas | Aug. 27, 1935 |
| 2,083,717 | Kohn | June 15, 1937 |
| 2,239,862 | Scalph et al. | Apr. 29, 1941 |